United States Patent [19]

Uebayasi et al.

[11] 4,005,991

[45] Feb. 1, 1977

[54] METAL MADE OF STEEL PLATE AND ALUMINUM MATERIAL

[75] Inventors: Yositaka Uebayasi; Hiroshi Kumon; Michinobu Yamada; Yoshikazu Oe, all of Hiroshima, Japan

[73] Assignee: Toyo Kogyo Co., Ltd., Japan

[22] Filed: Oct. 16, 1975

[21] Appl. No.: 623,005

Related U.S. Application Data

[63] Continuation of Ser. No. 317,684, Dec. 22, 1972, abandoned.

[30] Foreign Application Priority Data

Dec. 29, 1971 Japan ............................... 47-3108

[52] U.S. Cl. ............................... 29/196.2; 427/290; 427/329; 427/436

[51] Int. Cl.² .................... B32B 15/18; B32B 15/20

[58] Field of Search .......... 29/196.2; 427/290, 329, 427/436

[56] References Cited

UNITED STATES PATENTS

| | | | |
|---|---|---|---|
| 2,390,183 | 12/1945 | Seligman | 29/196.2 X |
| 2,490,548 | 12/1949 | Schultz | 29/196.2 |
| 3,093,885 | 6/1963 | Morrison et al. | 29/196.2 |
| 3,340,597 | 9/1967 | Stein et al. | 29/488 |
| 3,746,086 | 7/1973 | Pasternak | 165/181 |
| 3,959,030 | 5/1976 | Satake et al. | 427/292 |

FOREIGN PATENTS OR APPLICATIONS

| | | | |
|---|---|---|---|
| 758,303 | 7/1953 | Germany | 29/194 |

*Primary Examiner*—Arthur J. Steiner
*Attorney, Agent, or Firm*—Wenderoth, Lind & Ponack

[57] ABSTRACT

A metal casting made of a steel plate and an aluminum material mechanically interlocked with the steel plate. The metal casting has a resistance to wear, impact and/or elevated temperature, or has other required or desired characteristics such as good heat conductivity. In order to increase the bonding strength or shear strength, the steel plate is formed with a plurality of teeth each raised up from the steel plate and having a number of surface irregularities and the molten aluminum material penetrates into the primary interstices defined by the spaces between the teeth and the irregular interstices defined by the surface irregularities on each of the teeth.

8 Claims, 6 Drawing Figures

METAL MADE OF STEEL PLATE AND ALUMINUM MATERIAL

Figure 1:
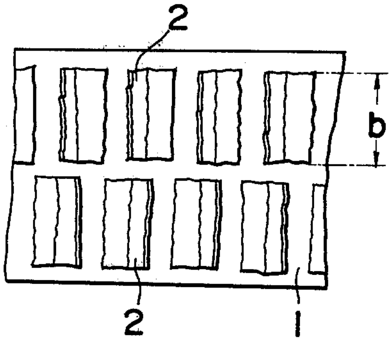

This application is a continuation of application Ser. No. 317,684, filed Dec. 22, 1972, now abandoned.

The present invention relates to a metallic workpiece, in which a steel plate and an aluminum material are mechanically interlocked and, more particularly, to a metal casting made of a steel plate mechanically interlocked with aluminum material, which has a resistance to wear, impact and/or elevated temperature, or has other required or desired characteristics such as a good heat conductivity.

Various methods have heretofore been practised of mechanically interlocking the base metal, such as made of cast iron or steel, with aluminum material including pure aluminum and its alloys.

A first one of these interlocking methods is known as an "Al-Fin" method wherein the interlocking is achieved in the presence of an intermetallic compound of chemical nature. So far as the automotive industry is concerned, this Al-Fin method is satisfactorily employed in the manufacture of an engine cylinder sleeve or interior lining or a brake drum because of the strong interlocking achieved in the presence of the intermetallic compound between a base metal containing iron as its essential component and a die-cast aluminum material or coating. However, this method requires precautions to achieve satisfactory interlocking of molten aluminum material to the base metal in such a way that the base metal must receive a relatively complicated pretreatment. Moreover, the intermetallic compound connecting between the aluminum coating and the base metal is so relatively fragile that the bondability is correspondingly low to such an extent as to incur some problems in practical use.

A second one of the conventionally employed interlocking methods is known as a "transplant" method which is disclosed in the U.S. Pat. No. 3,083,424 and patented on Apr. 2, 1963. According to this method, the base metal formed by metal spraying technique on the core is transplanted to and mechanically interlocked with an aluminum material or coating by means of die casting. This transplant method affords the bondability higher than that by the previously mentioned Al-Fin method due to the fact that the surface of the base metal to which the aluminum material or coating is bonded is roughened during the metal spraying process, forming numerous interstices into which the aluminum material or coating in its molten state penetrates. However, even in this method, complicated precautions are required, or a relatively great amount of oxides will be included in the base metal as formed during the formation of the metal sprayed base. Accordingly, the metal made by this method without the precautions being taken into consideration has in general a relatively high hardness, but a relatively low mechanical strength, thus reducing the machinability, and such metal has an insufficient heat conductivity.

A third one of the conventional interlocking methods is the one wherein the base metal having a surface formed with a plurality of substantially right-angled projections formed by grinding, grooving or threading, the top of each of which projections is subsequently flattened such as by means of rolling or press work to provide substantially laterally extending lugs, is mechanically interlocked with the aluminum material by means of die casting or pouring. In this method, the aluminum material, during the die casting or pouring, penetrates into interstices of complicated shape defined by the base metal surface, the projections and the lugs and, accordingly, a relatively strong interlocking can be obtained between the base metal and the aluminum material or coating. However, the number of the projections formed in the base metal is practically limited, with the projections each having smooth side faces and oriented in the same directions, and, therefore, the bondability and the heat conductivity remain in question unless chemical bonding is effected such as by means of copper brazing or copper plating. In any event, this method increases the number of steps of manufacture, beyond that heretofore practised by the other methods.

A fourth one of the conventional interlocking methods is the one wherein the base metal having a surface formed with a plurality of substantially square lugs, the side faces and top face of which are roughened by pulverized glass and graphite adhering to the mold impression, is interlocked with the aluminum material or coating by means of die casting. In this method, prior to die casting, not only a mold to be used to produce the base metal with the square lugs must be prepared, but also cleaning the pulverized glass and graphite off from the mold impression is required. Moreover, the bondability obtainable by this method is relatively low and, due to the fact that no chemical bonding is effected between the base metal and the aluminum material or coating, the contact area therebetween is so small that the heat conductivity is insufficient to an extent that the metal produced by this method can not be satisfactorily used for internal combustion engine parts which are often subjected to heat stress and mechanical stresses.

In any event, the metal produced by any of the conventionally practised methods has a variety of disadvantages and, accordingly, the present invention has been made in view of eliminating these disadvantages.

An essential object of the present invention is to provide an improved metal casting made of a steel plate formed into a desired shape and having a plurality of teeth raised up from the plate and an aluminum material mechanically interlocked with said steel plate with or without utilizing brazing technique, which has a resistance to wear, impact and/or elevated temperature, or has other required or desired characteristics.

Another important object of the present invention is to provide an improved metal casting of the above character, which can be easily manufactured without requiring complicated manufacturing steps.

According to the present invention, during the manufacture of the metal casting, the steel plate is processed to provide a plurality of teeth of suitable thickness, width and height on at least one surface of the steel plate by raising up parts of the plate from the same, the steel plate is formed into a desired shape and the aluminum material is permanently bonded to the plate by means of die casting. For obtaining the optimum results, the number of the teeth per unit area of the steel plate is preferably great while each of said teeth has a proper volume and is formed with a plurality of surface irregularities on the faces thereof thereby increasing the contact area where the steel plate and the aluminum material are interlocked with each other during subsequent die casting. The increase of the contact area, in fact, improves the conductivity of heat between said steel plate and the aluminum material, as well as the bondability therebetween.

The teeth formed on the steel plate may be arranged in any suitable or desired manner. For example, the teeth, each usually extending at a certain angle with respect to the plane of the steel plate or base plate which is made or ordinary steel or special steel containing iron as its essential component, may be arranged in a plurality of groups depending upon the size of the resultant metal to be used for a particular purpose. In this case, it is advisable to incline the teeth of one group in one direction and those of the adjacent group in a different direction while adjacent groups may be properly spaced from each other.

Although the sufficient bondability as well as heat conductivity can be obtained without requiring any additional processing such as brazing or plating to be otherwise effected at the boundary between the base plate and the aluminum material, either brazing or plating may be effected in the case where a heat conductivity higher than those obtainable without effecting the brazing or plating are desired.

Furthermore, according to the present invention, there is also provided a method of making the metal casting mentioned above.

Figure 3:
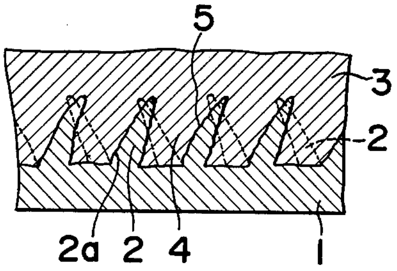
Figure 2:
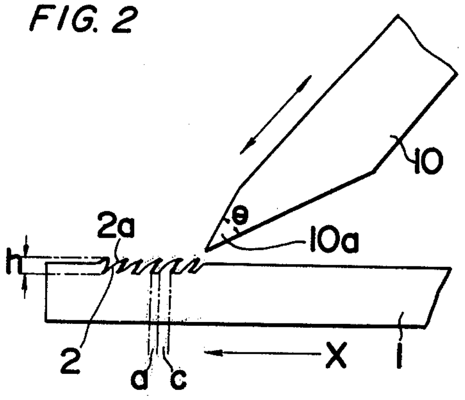
Figure 6:
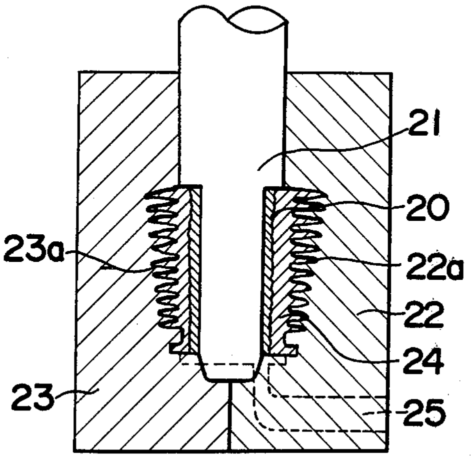
Figure 4:
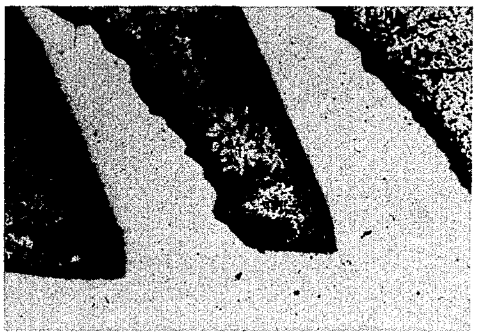
Figure 5:
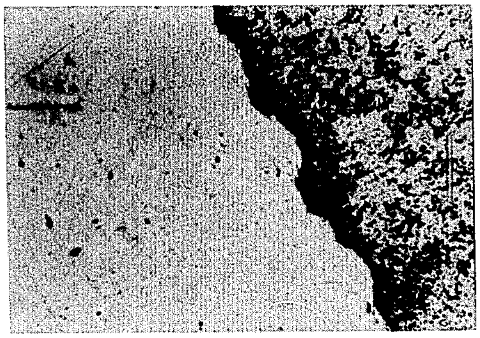

These and other objects and features of the present invention will become apparent from the following description taken in conjunction with a preferred embodiment thereof with reference to the accompanying drawings, in which:

FIG. 1 is a schematic top plan view of a portion of a base plate showing an arrangement of teeth formed in accordance with the present invention, FIG. 2 is a schematic side view showing a manner by which the teeth are formed on the base plate, FIG. 3 is a schematic side view, on an exaggerated scale, showing the shape of each of the teeth, FIG. 4 is a photomicrograph, magnified 58 times, showing a portion of the bonding boundary between the base plate and the aluminum material according to the present invention, FIG. 5 is a photomicrograph, magnified 400 times, of a portion of the bonding boundary taken in the photomicrograph of FIG. 4, and FIG. 6 is a schematic sectional view of a die casting assembly which can be used to produce the metal casting according to the present invention.

Before the description of the present invention proceeds, it is to be noted that the term "irregularity" or "surface irregularity" as used herein and in the appended claims is to be understood as referring to surface irregularities including wrinkles, cracks, splinters and other surface-roughening traces, naturally formed during the formation of the teeth on the base plate. These surface irregularities are larger than those present on the surface of the metal due to the nature of the metal itself or the process by which it is initially formed into a plate or the like prior to formation of the teeth, such as pores, scratches and the like. These irregularities are, on the other hand, smaller than the teeth themselves.

Referring to the accompanying drawings and, particularly, to FIGS. 1 to 5, a base plate 1, made of steel, is shown as formed with a plurality of teeth 2 arranged in two rows in the lengthwise direction of said base plate 1, the teeth 2 of one row being inclined in one direction while the teeth 2 of the other row are inclined in a different, especially opposite direction. These two rows of the teeth 2 on the base plate 1 are displaced with respect to each other in such a manner that each of the teeth 2 of one row are situated on a line extending substantially between the two adjacent teeth 2 of the other row as clearly shown in FIGS. 1 and 3.

The teeth 2 each preferably have a particular construction sufficient to fulfill the following requirements to obtain the optimum results: the number of the teeth 2 per unit area of the base plate 1 must be relatively great with each of these teeth 2 having a proper volume. In addition, surface irregularities to be, as will be mentioned later, formed on at least one face of each of the teeth 2 must be considerable while the teeth 2 have preferably different inclinations with respect to the plane of the base plate 1.

If the number of the teeth 2 per unit area is increased, the contact area between the base plate 1 and a subsequently bonded aluminum material 3 correspondingly increases and, consequently, not only the heat conductivity of the resultant compound metal can be improved, but also the bond between the base plate 1 and the aluminum material 3 is improved. The volume of each of the teeth 2 must be such that the heat capacity of the teeth is low. This requirement is of relatively great importance since molten aluminum material containing pure alluminum or one or more of its alloys must be, during die casting, permitted to penetrate into interstices 4 formed between the teeth 2 and also into interstices defined by the surface irregularities 5 on the face of each of the teeth 2, without being solidified by the effect of heat exchange before it has sufficiently penetrated thereinto.

The provision of the surface irregularities 5 on at least one face 2*a* of each of the teeth 2 contributes not only to the increase of the bonding action, but also to the increase of the contact area, between the base plate 1 and the aluminum material 3. Furthermore, if the teeth 2 are formed at different inclinations with respect to the plane of the base plate 1, the bonding action can be additionally increased as compared with that afforded by the teeth formed at the same inclinations.

Hereinafter, a manner of forming the teeth 2 on the base steel plate 1 will be described with reference to FIG. 2. The teeth 2 on the base plate 1 are simply formed by the use of a reciprocally movable chisel 10 having a knife edge 10*a* of suitable width. It is clear that, if the chisel 10 is reciprocally driven while the base plate 1 is intermittently moved or transferred in the lengthwise direction as indicated by the arrow X, a row of the teeth 2 can be readily formed. Preferably, the knife edge 10*a* of the chisel has a certain angle $\theta$ selected such that, when the chisel 10 is driven on to the base plate 1 thereby to cause the skin of said plate 1 to raise up thus forming each tooth 2, the surface irregularities are naturally formed, as clearly observable from the photomicrographs of FIGS. 4 and 5, especially on one of the opposite faces 2*a* of each tooth 2 which has not contacted the chisel 10, while the tooth 2 itself extends at a certain angle with respect to the plane of the plate 1.

In order to improve the resistance to shearing force which acts to slide the base plate 1 and the aluminum material 3 interlocked with the base plate 1 relative to each other, if the base plate 1 is a 2 mm. in thickness, the sum of the thickness *c* at the root of each tooth 2 and the interval a between the two adjacent teeth, which may be referred to as the pitch P, is preferably within the range of from 0.5 to 2.0 mm. while the height $h$ of each tooth 2 is within the range of from 0.5 to 3.0 mm. Preferably, the ratio of the thickness $c$ to the interval $a$, i.e., $a/c$, is substantially equal to or smaller than 2.

The compound metal casting can be manufactured by the use of the base steel plate 1 having thereon the teeth 2 formed by the aforesaid method, said base plate 1 being subsequently interlocked with the aluminum material 3 by means of a die casting which will be hereinafter described with reference to FIG. 6.

FIG. 6 schematically illustrates the die casting assembly for use in the production of an internal combustion engine cylinder. The base plate having thereon the teeth 2 is shown as formed into a cylinder sleeve 20 mounted on a die casting mandrel 21. Formation of the cylinder sleeve 20 may be made by curling the base plate 1 with the teeth 2 thereon and then joining the opposed ends of said plate 1.

The die casting assembly includes, in addition to the mandrel 21, a pair of fixed and movable dies 22 and 23 having respective casting impressions 22*a* and 23*a* which define a casting cavity 24. Molten aluminum material, which forms the casting 3 together with the steel plate upon solidification, is supplied into the casting cavity 24 under pressure via a passage 25 usually formed in the fixed die 22. The pressure of the molten aluminum material must be sufficiently high to permit it to penetrate into the interstices 4 formed by the teeth 2 and also into the interstices defined by the surface irregularities 5 on the face 2*a* of each of the teeth 2.

Hereinafter, the present invention will be illustrated by way of example.

EXAMPLE (I)

The internal combustion engine cylinder was manufactured in the manner as described above and shown in FIG. 6. During this manufacture, a cylinder sleeve 20 formed by the use of a steel plate consisting of cold rolled steel (SPCC) 1.5 mm. in thickness was employed. The metallic plate had formed therein teeth arranged in the manner as shown in FIG. 1 and each having the following specifications:

| | |
|---|---|
| Pitch (= a + c) | 0.75 mm. |
| Height (= h) | 1.20 mm. |
| Thickness (= c) | 0.45 mm. |
| Width (= b) | 2.50 mm. |

The details of each of the teeth thus formed are shown in the photomicrograph of FIG. 4, and the manner of formation of these teeth is as hereinbefore described with reference to FIG. 2.

The engine cylinder sleeve 20 thus formed is interlocked by means of die casting with an aluminum alloy as specified by AC4D according to the Japanese Industrial Standard which is an equivalent of Alcoa 355 or SAE 333, thereby to form the engine cylinder 20. After the engine cylinder 20 has been removed from the die casting assembly and completely cooled, a test piece, 10 mm. in length, 5 mm. in width and 50 mm. in thickness including the thickness (1.5 mm.) of the steel plate, was prepared from the finished engine cylinder for measurement of the strength of the bond between the steel plate (i.e., engine cylinder sleeve) and the aluminum alloy interlocked with the plate in terms of the shear strength.

The shear strength measurement was carried out by applying a load to the aluminum alloy portion in the lengthwise direction while the steel plate is held fixed. As a result of this measurement, it has been found that the relative sliding movement between the steel plate and the aluminum alloy portion firmly interlocked therewith in accordance with the teachings of the present invention took place when the load attained 11.6 kg/mm$^2$. This value is, in fact, approximately twice the shear strength afforded by the fourth mentioned one of the conventionally practised interlocking methods, and has successfully exceeded the level of 10 kg/mm$^2$ which can hardly be attained by the conventional transplant method or others.

In view of the foregoing, the engine cylinder thus manufactured can exhibit and excellent performance because of the high shear strength as described above which is usually required in engine parts such as the engine cylinder.

The present invention being thus fully described, it will be obvious that the same may be varied in many ways. Such variations are not to be regarded as a departure from the spirit and scope of the present invention, and all such modifications are intended to be included within the scope of the following claims.

What is claimed is:

1. A metal composite comprising a steel plate having a desired shape and an aluminum material permanently bonded by being cast onto said steel plate on at least one of the opposed surfaces of said steel plate, said one of the surfaces of said steel plate having thereon a plurality of teeth spaced at predetermined intervals therealong to define primary interstices therebetween, each of said teeth being raised up from, extending outwardly from and being integral with said one of the surfaces of said plate, each of said teeth being inclined relative to the plane of said one of said surfaces of said steel plate and also to a plane perpendicular to said plane of said one of said surfaces of said steel plate, and each of said teeth having on a surface thereof a plurality of surface irregularities, and said irregularities having irregular interstices therebetween, said aluminum material extending into the primary and irregular interstices thereby to provide a firm interlock between said steel plate and said aluminum material, said surface irregularities being formed by the step of driving a chisel into the one surface of the steel plate at an angle to the plane of the surface of the plate for raising the teeth up out of the surface of the plate, the surface irregularities being formed naturally on the surfaces of the teeth as the teeth are raised out of the surface of the plate.

2. A composite as claimed in claim 1, wherein the sum of the thickness of each tooth at the root thereof and the interval between two adjacent teeth is within the range of from 0.5 to 2.0 mm. and the height of each tooth is within the range of from 0.5 to 3.0 mm.

3. A composite as claimed in claim 2, wherein the ratio of said thickness to said interval is smaller than 2.

4. A composite in claim 1, wherein said teeth are in at least two rows, the teeth of one row being inclined in one direction with respect to said steel plate while the teeth of the other row are inclined in a direction different from that of said teeth of said one row.

5. A composite as claimed in claim 4, wherein said two rows of teeth are spaced from each other.

6. A composite as claimed in claim 1, wherein said teeth have said surface irregularities mainly on said face of each of said teeth which faces away from said one surface of said steel plate.

7. A composite as claimed in claim 1, wherein the teeth taper from the surface of the steel plate to a point at the tip thereof.

8. A composite as claimed in claim 1, wherein the interlock between the steel plate and the aluminum material is achieved by means of die casting.

* * * * *